US008861443B2

(12) United States Patent
Shirani-Mehr et al.

(10) Patent No.: US 8,861,443 B2
(45) Date of Patent: Oct. 14, 2014

(54) METHOD AND APPARATUS FOR POWER CONTROL IN FULL-DUPLEX WIRELESS SYSTEMS WITH SIMULTANEOUS TRANSMISSION RECEPTION

(71) Applicant: Intel Corporation, Santa Clara, CA (US)

(72) Inventors: Hooman Shirani-Mehr, Portland, OR (US); Yang-Seok Choi, Portland, OR (US); Rongzhen Yang, Shanghai (CN); Apostolos Papathanassiou, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 49 days.

(21) Appl. No.: 13/623,294

(22) Filed: Sep. 20, 2012

(65) Prior Publication Data
US 2014/0078939 A1 Mar. 20, 2014

(51) Int. Cl.
*H04W 4/00* (2009.01)
*H04W 52/24* (2009.01)

(52) U.S. Cl.
CPC ............ *H04W 52/241* (2013.01); *H04W 52/24* (2013.01)
USPC ......................................................... 370/328

(58) Field of Classification Search
CPC ..... H04W 24/00; H04W 84/18; H04W 84/12; H04W 88/08; H04W 52/02; H04W 52/00; H04L 2012/5608; H04B 7/2606
USPC ............... 370/252, 310, 310.2, 329, 331, 338
See application file for complete search history.

(56) References Cited

U.S. PATENT DOCUMENTS

| | | | | |
|---|---|---|---|---|
| 8,155,097 | B2 * | 4/2012 | Leung et al. | ................... 370/342 |
| 8,483,742 | B2 * | 7/2013 | Kim et al. | ..................... 455/522 |
| 2011/0111766 | A1 | 5/2011 | Yang et al. | |
| 2011/0207499 | A1 | 8/2011 | Liu | |
| 2012/0115498 | A1 | 5/2012 | Kim et al. | |

FOREIGN PATENT DOCUMENTS

WO 2014/046761 A1 3/2014

OTHER PUBLICATIONS

International Search Report and Written Opinion Received for Patent Application No. PCT/US2013/047498, mailed on Sep. 26, 2013, 12 Pages.

* cited by examiner

*Primary Examiner* — Anh Ngoc Nguyen
(74) *Attorney, Agent, or Firm* — Cool Patent, P.C.

(57) ABSTRACT

Wireless-device-to-wireless device (WD-WD) interference in a full-duplex wireless network is managed by an uplink transmit power control technique that minimizes interference experienced in downlink signals at other wireless devices in the wireless network. In one exemplary embodiment, an instantaneous antenna gain of the wireless device and a target uplink Signal-to-Interference-plus-Noise Ratio (SINR) of an uplink signal of the wireless device to the home base station are determined at the wireless device. A Noise plus Interference level at the home base station is received by either a closed-loop or an open-loop feedback technique. The uplink power level for an uplink signal of the wireless device is determined based on the determined antenna gain, the determined target uplink SINR and the received Noise plus Interference level at the home base station.

30 Claims, 13 Drawing Sheets

METHOD AND APPARATUS FOR POWER CONTROL IN FULL-DUPLEX WIRELESS SYSTEMS WITH SIMULTANEOUS TRANSMISSION RECEPTION

TECHNICAL FIELD

Embodiments described herein are generally directed to the field of wireless communications.

BACKGROUND

Conventional wireless systems are half-duplex, that is, uplink (UL) and downlink (DL) transmissions are performed in orthogonal time resources (Time-Division Duplex (TDD)) or in orthogonal frequency resources (Frequency-Division Duplex (FDD)).

One approach to increase the spectral efficiency (SE) of a wireless system is to use full-duplex transmitter and receivers that transmit and receive at same time and frequency. With such a full-duplex system, and under an ideal assumption that no new interference signals would be added to such a system, double spectral efficiencies would be achieved for both DL and UL in comparison to the UL and DL spectral efficiencies of a conventional half-duplex system. In practice, however, some additional interference signals would be introduced into the system due to simultaneous transmission and reception (STR).

BRIEF DESCRIPTION OF THE DRAWINGS

Embodiments disclosed herein are illustrated by way of example, and not by way of limitation, in the figures of the accompanying drawings in which like reference numerals refer to similar elements and in which.

Figure 1:
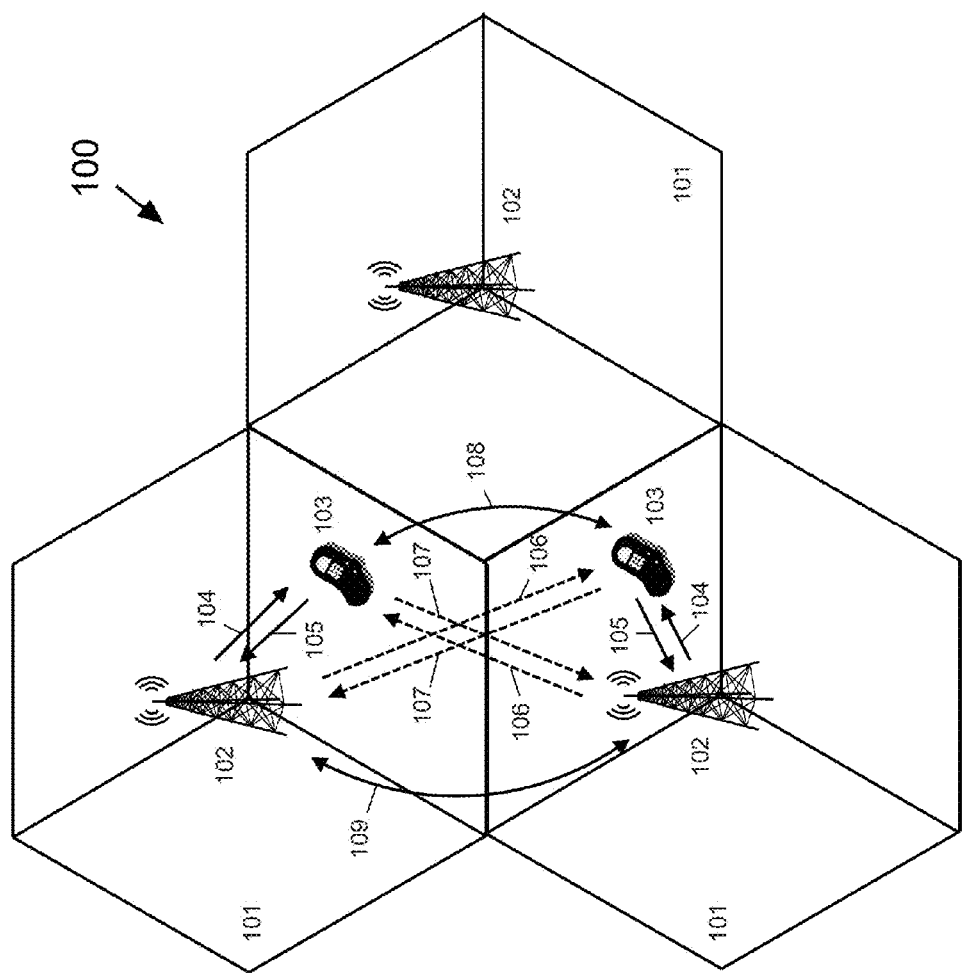
FIG. 1 depicts an exemplary full-duplex system and the signals that are useful and the signals that cause interference that are associated with the system.

It will be appreciated that for simplicity and/or clarity of illustration, elements depicted in the figures have not necessarily been drawn to scale. For example, the dimensions of some of the elements may be exaggerated relative to other elements for clarity. The scaling of the figures does not represent precise dimensions and/or dimensional ratios of the various elements depicted herein. Further, if considered appropriate, reference numerals have been repeated among the figures to indicate corresponding and/or analogous elements.

DESCRIPTION OF THE EMBODIMENTS

Embodiments of devices and techniques described herein relate to wireless communications. More particularly, the subject matter disclosed herein provides a system and technique for managing wireless device-to-wireless device (WD-WD) inference in a full-duplex system by providing an uplink-transmit-power control technique for a WD that reduces interference experienced at other WDs. In the following description, numerous specific details are set forth to provide a thorough understanding of embodiments disclosed herein. One skilled in the relevant art will recognize, however, that the embodiments disclosed herein can be practiced without one or more of the specific details, or with other methods, components, materials, and so forth. In other instances, well-known structures, materials, or operations are not shown or described in detail to avoid obscuring aspects of the specification.

Reference throughout this specification to "one embodiment" or "an embodiment" means that a particular feature, structure or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments. Additionally, the word "exemplary" is used herein to mean "serving as an example, instance, or illustration." Any embodiment described herein as "exemplary" is not to be construed as necessarily preferred or advantageous over other embodiments.

Various operations may be described as multiple discrete operations in turn and in a manner that is most helpful in understanding the claimed subject matter. The order of description, however, should not be construed as to imply that these operations are necessarily order dependent. In particular, these operations need not be performed in the order of presentation. Operations described may be performed in a different order than the described embodiment. Various additional operations may be performed and/or described operations may be omitted in additional embodiments.

FIG. 1 depicts an exemplary full-duplex system 100, and the signals that are useful and the signals that cause interference that are associated with system 100. System 100 comprises a plurality of cells 101, of which only three cells are shown and that are represented by hexagonal shapes. Each cell 101 can have one or more sectors, which are represented as rhombuses within a hexagonal shape. It should be understood that a cell 101 and/or a sector respectively can and do in reality have a shape different from a hexagon or a rhombus. Each cell 101 comprises at least one base station (BS) 102. A plurality of wireless devices (WDs) 103 are located throughout system 100, although only two WDs are shown.

A base station 102 can be embodied as, but is not limited to, an evolved NodeB (eNB or eNodeB), a macro-cell base station, a pico-cell base station, a femto-cell base station, or the like as described herein. A wireless device 103 can embodied as, but is not limited to, a mobile station (MS), a subscriber station (SS), a Machine-to-Machine-type (M2M-type) device, customer premises equipment (CPE), a User Equipment (UE), a notebook-type computer, a tablet-type device, a cellular telephone, a smart-type device, a smartphone, a personal digital assistant, an information-handling system, or the like as described herein.

Useful downlink (DL) signals from a BS 102 to a WD 103 are indicated at 104. Useful uplink (UL) signals from a WD 103 to a BS 102 are indicated at 105. For a half-duplex system, a downlink signal 104 generated by a BS 102 for a WD 103 connected to the BS causes an interference signal 106 to be received at a WD 103 that is not connected to the BS. Similarly, an uplink signal 105 generated by a WD 103 causes an interference signal 107 to be received at a BS 102 to which the WD is not connected. Interference signals 106 and 107 are represented by dashed lines in FIG. 1.

In addition to interference signals 106 and 107 that occur in a half-duplex system, a full-duplex system would include two new interference signals that would be caused by Simultaneous Transmit and Receive (STR). In particular, a WD-WD interference signal 108 would be observed when one WD is transmitting in an uplink signal to its home BS while the other WD would be receiving a downlink signal from its home BS. The second new interference signal that would be caused by STR would be a BS-BS interference signal 109, and would be observed when one BS is transmitting in a downlink signal to a WD while another BS is receiving an uplink signal from a WD.

Figure 2:
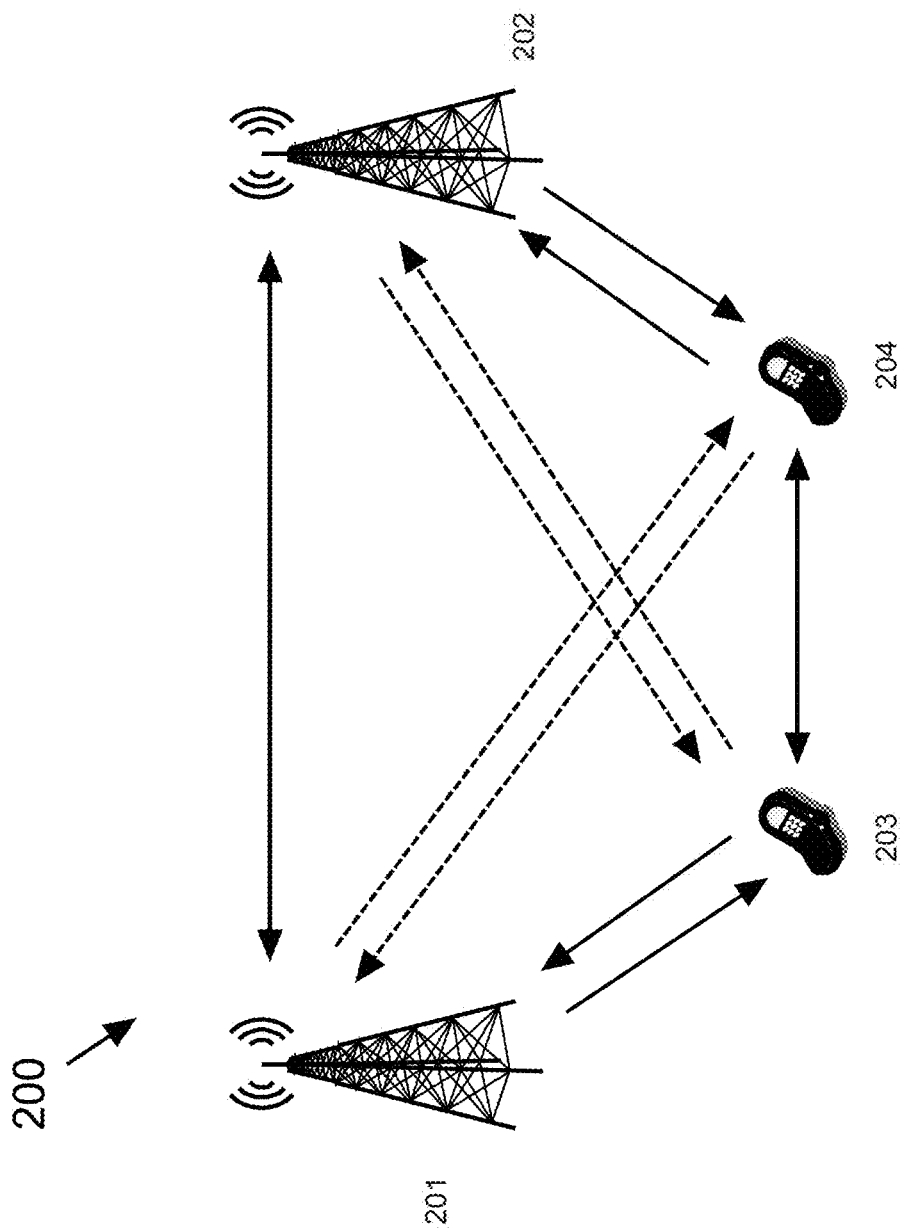
FIG. 2 depicts a frequency-flat channel, full-duplex system and the useful and interference signals associated with the system.

FIG. 2 depicts a frequency-flat channel, full-duplex system 200 and the useful and interference signals associated with system 200. A frequency-flat channel is assumed for full-duplex system 200 to simplify explanation of the subject matter disclosed herein. It should be understood that the frequency-flat channel aspect is an assumption and the claimed subject matter is not so limited. Additionally, for a given WD, all other WDs and non-home BSs are respectively modeled as a "virtual WD" and "virtual BS" to model the effect of other UEs and eNBs in system 200 to further simplify explanation. As depicted in FIG. 2, system 200 comprises a home base station (BS) 201, a virtual BS 202, a subject WD 203 and a virtual WD 204. Home BS 201 and virtual BS 202 could be physically embodied as, but is not limited to, an evolved NodeB (eNB or eNodeB), a macro-cell base station, a pico-cell base station, a femto-cell base station, or the like described herein. Subject WD 203 and virtual WD 204 could be physically embodied as, but is not limited to, a mobile station (MS), a subscriber station (SS), a Machine-to-Machine-type (M2M-type) device, customer premises equipment (CPE), a User Equipment (UE), a notebook-type computer, a tablet-type device, a cellular telephone, a smart-type device, a smartphone, a personal digital assistant, an information-handling system, or the like described herein.

In the following description and in FIG. 2, a subscript "1" designates an UL signal or an interference signal received at home BS 201. A subscript "2" designates an UL signal or an interference signal received at virtual BS 202. A subscript "3" designates a DL signal or an interference signal received at virtual WD 204. Additionally, $G_1$ represents the instantaneous antenna gain between WD 203 and its home BS 201. $G_2$ represents the instantaneous antenna gain between WD 203 and a virtual BS 202. Lastly, $G_3$ represents the instantaneous antenna gain between WD 203 and a virtual WD 204.

The spectral efficiencies (SEs) for a UL signal at home BS 201 ($SE_{Home\ eNB}^{UL}$), a UL signal at virtual BS 202 ($SE_{Virtual\ eNB}^{UL}$), and a DL signal at virtual WD 204 ($SE_{Virtual\ UE}^{DL}$) in system 200 can be respectively written as:

$$SE_{Home\ eNB}^{UL}(P) = \log\left(1 + \frac{PG_1}{N_1 + I_1}\right), \quad (1)$$

$$SE_{Virtual\ eNB}^{UL}(P) = \log\left(1 + \frac{SNR_2 N_2}{N_2 + I_2 + PG_2}\right), \quad (2)$$

and $$SE_{Virtual\ UE}^{DL}(P) = \log\left(1 + \frac{SNR_3 N_3}{N_3 + I_3 + PG_3}\right), \quad (3)$$

in which P is the UL transmit power at WD 203, N is the level of additive white Gaussian noise (AWGN), I is the level of interference, $SNR_2$ is UL Signal-to-Noise ratio (SNR) at virtual BS 202, $SNR_3$ is the DL SNR at virtual WD 204, and $G_1$, $G_2$ and $G_3$ are instantaneous antenna gains defined elsewhere herein.

One possible optimization problem would be to maximize of the sum of UL and DL spectral efficiencies at selected points in system 200 for a given maximum power constraint at a selected WD, such as WD 203. That is, for WD 203, the following optimization problem should be solved:

$$\max_{0 \leq P \leq P_{max}} SE_{Home\ eNB}^{UL}(P) + SE_{Virtual\ eNB}^{UL}(P) + SE_{Virtual\ UE}^{DL}(P) + K, \quad (4)$$

in which K is the sum of the UL spectral efficiency at virtual WD 204 and the DL spectral efficiency at WD 203, and in which K is not function of P. Other objective functions could be considered as well, such as a weighted sum of UL and DL SEs, depending on the UL and DL system requirements.

In one exemplary approach, the optimization problem of Equation (4) could be solved precisely by applying Karush-Kuhn-Tucker (KKT) conditions. In another exemplary approach, as described herein, the following heuristic approach is used:

$$f(P) = \frac{1}{\ln(2)}\left[\ln\left(1 + \frac{PG_1}{N_1 + I_1}\right) + \ln\left(1 + \frac{SNR_2 N_2}{N_2 + I_2 + PG_2}\right) + \ln\left(1 + \frac{SNR_3 N_3}{N_3 + I_3 + PG_3}\right)\right], \quad (5)$$

and $$\max_{0 \leq P \leq P_{max}} f(P) \Rightarrow f'(P) = 0. \quad (6)$$

Thus, $$\frac{\frac{G_1}{N_1 + I_1}}{1 + \frac{PG_1}{N_1 + I_1}} + \frac{-\frac{SNR_2 N_2 G_2}{(N_2 + I_2 + PG_2)^2}}{1 + \frac{SNR_2 N_2}{N_2 + I_2 + PG_2}} + \frac{-\frac{SNR_3 G_3}{(N_3 + I_3 + PG_3)^2}}{1 + \frac{SNR_3 N_3}{N_3 + I_3 + PG_3}} = 0. \quad (7)$$

Algebraic manipulation yields $$\frac{G_1}{N_1 + I_1 + PG} = \frac{G_2}{N_2 + I_2 + PG_2} \frac{SINR_2}{1 + SINR_2} + \frac{G_3}{N_3 + I_3 + PG_3} \frac{SINR_3}{1 + SINR_3}. \quad (8)$$

By assuming $SINR_2 \gg 1$ and $SINR_3 \gg 1$, $$\frac{G_1}{N_1 + I_1 + PG_1} < \frac{G_2}{N_2 + I_2 + PG_2} + \frac{G_3}{N_3 + I_3 + PG_3}. \quad (9)$$

Equation (9) implies that $$\frac{PG_1}{N_1 + I_1} < \frac{1}{\frac{G_2}{G_1}\frac{N_1+I_1}{N_2+I_2PG_2} + \frac{G_3}{G_1}\frac{N_1+I_1}{N_3+I_3+PG_3}} - 1. \quad (10)$$

Replacing the left side of Equation (10) with the UL SINR at home BS 201 ($SINR_1$) yields.

$$SINR_1 < \frac{1}{\frac{G_2}{G_1}\frac{N_1+I_1}{N_2+I_2+PG_2} + \frac{G_3}{G_1}\frac{N_1+I_1}{N_3+I_3+PG_3}} - 1. \quad (11)$$

Defining parameter $$\gamma_1 = \frac{N_1+I_1}{N_2+I_2+PG_2} \text{ and } \gamma_2 = \frac{N_1+I_1}{N_3+I_3+PG_3}$$

and substituting into Equation (11) yields $$SINR_1 < \frac{1}{\frac{G_2}{G_1}\gamma_1 + \frac{G_2}{G_1}\gamma_2} - 1. \quad (12)$$

Gains $G_1$, $G_2$ and $G_3$ can be calculated (approximately) based on half-duplex DL signal-to-interference ratio $SIR_{DL,atUE}^{Non-STR}$ and full-duplex DL signal to UTE-UE interference ratio $SI_{US-UE}R_{DL,atUE}^{STR}$ as:

$$SIR_{DL,atUE}^{Non-STR} = \quad (13)$$

$$\frac{P_{BS}^{DL}G_1}{\sum_i P_{BS}^{DL}G_{BS_1-UE}} = \frac{G_1}{\sum_i G_{BS_1-UE}} \approx \frac{G_1}{G_2} \Rightarrow \frac{G_2}{G_1} \approx \frac{1}{SIR_{DL,atUE}^{Non-UE}},$$

and $$SI_{UE-UE}R_{DL,atUE}^{STR} = \quad (14)$$

$$\frac{P_{BS}^{DL}G_1}{\sum_i P_{UE_1}^{UL}G_{UE_1-UE}} \approx K\frac{G_1}{G_3} \Rightarrow \frac{G_3}{G_1} \approx K'\frac{1}{SI_{UE-UE}R_{DL,atUE}^{STR}}.$$

Finally, target UL SINR at home BS 201 can be written as $$SINR_{target}(dB) \approx \begin{cases} 10\log_{10}\left(\max\left(10^{-\frac{SINR_{Min}}{10}}, \gamma \times SIR_{DL,atUE}^{Non-STR} - 1\right)\right) & Non\text{-}STR \\ 10\log_{10}\left(\max\left(10^{-\frac{SINR_{Min}}{10}}, \frac{1}{\gamma_1 \times \frac{1}{SIR_{DL,atUE}^{Non-STR}} + \gamma_2 \times \frac{1}{SI_{UE-UE}R_{DL,atUE}^{STR}}} - 1\right)\right) & STR \end{cases} \quad (15)$$

in which $SINR_{MIN}$ is the minimum UL SINR in dB at the home BS 201 for cell-edge WDs, and $$\gamma = \frac{1}{\gamma_1}.$$

Consequently, optimization of Equation (4) by the heuristic disclosed herein provides that the UL transmit power at WD 203 is $$P(dBm) = G_1 + SINR_{Target} + N_1 + I_1. \quad (16)$$

In Equation (16), the first two terms on the right side are determined at WD 203. $G_1$, for example, is measured at the WD based on a received signal. The second two terms on the right of Equation (16), i.e., UL noise-plus-interference level ($N_1 + I_1$) at home BS 201, is determined by home BS 201, and sent to WD 203 by either an open-loop or a closed-loop feedback technique.

Figure 3A:
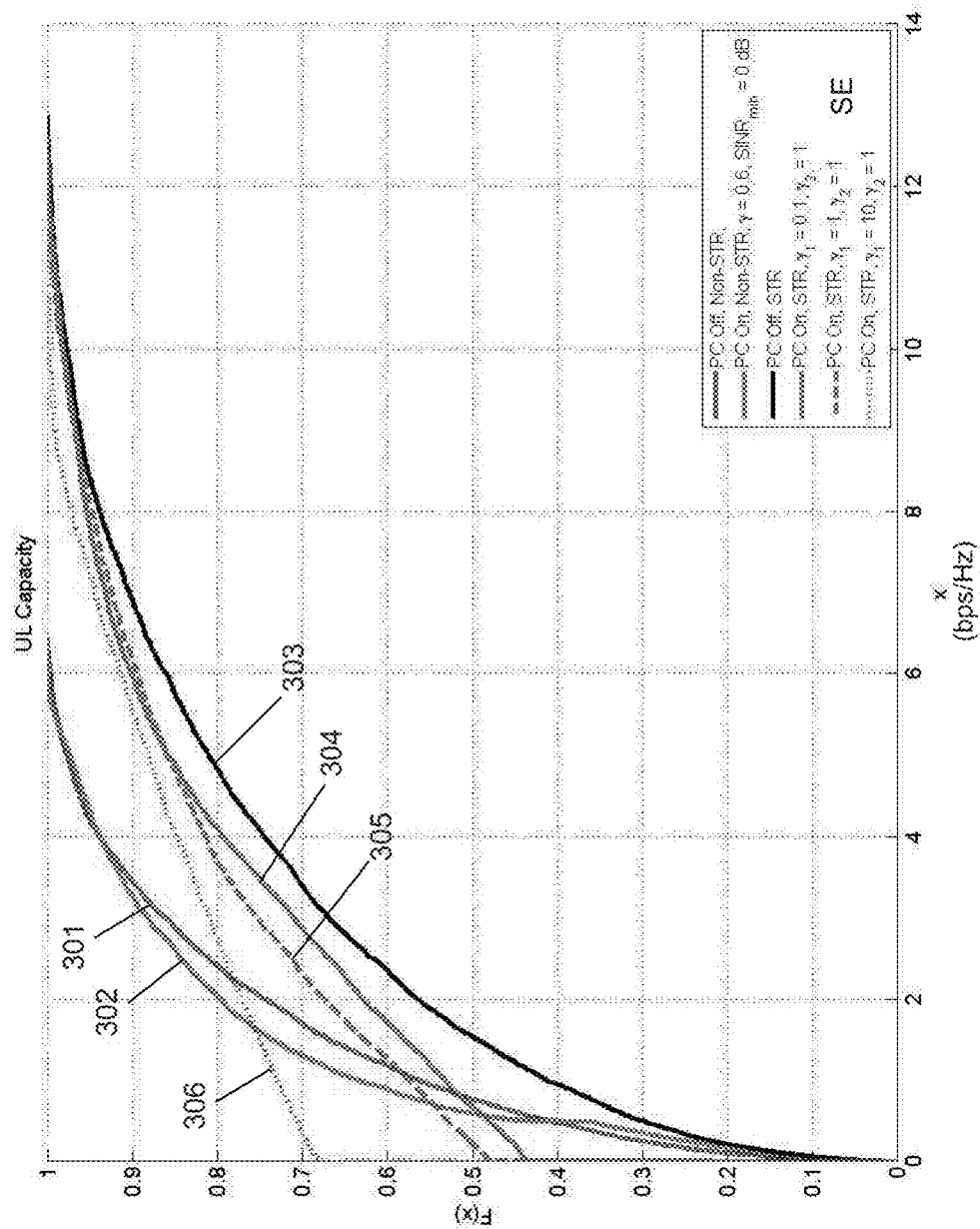
FIGS. 3A-3C respectively illustrate uplink, downlink, and uplink+downlink spectral efficiencies for different values of $\gamma_1$ and $\gamma_2$ according to the subject matter disclosed herein.
Figure 3B:
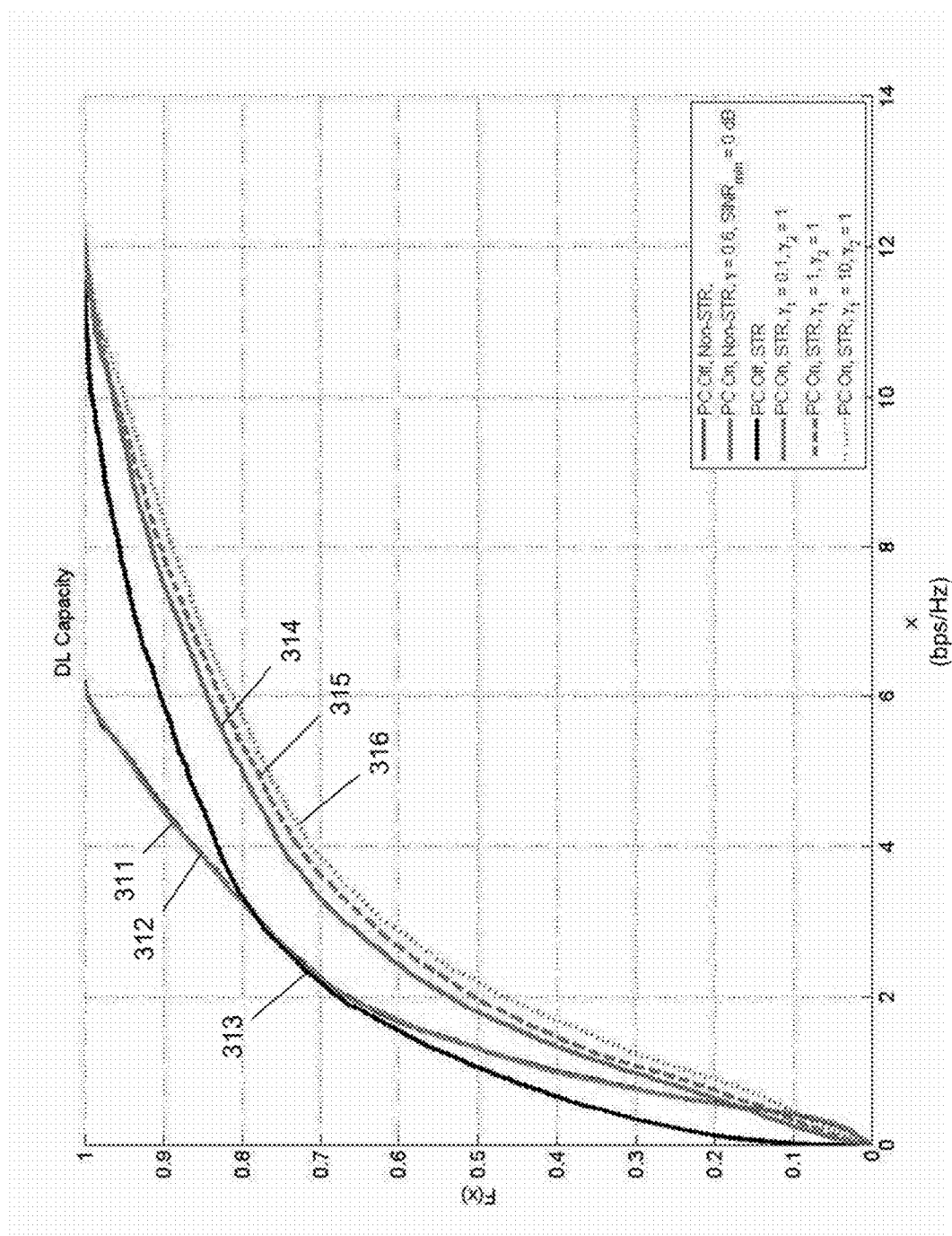
Figure 3C:
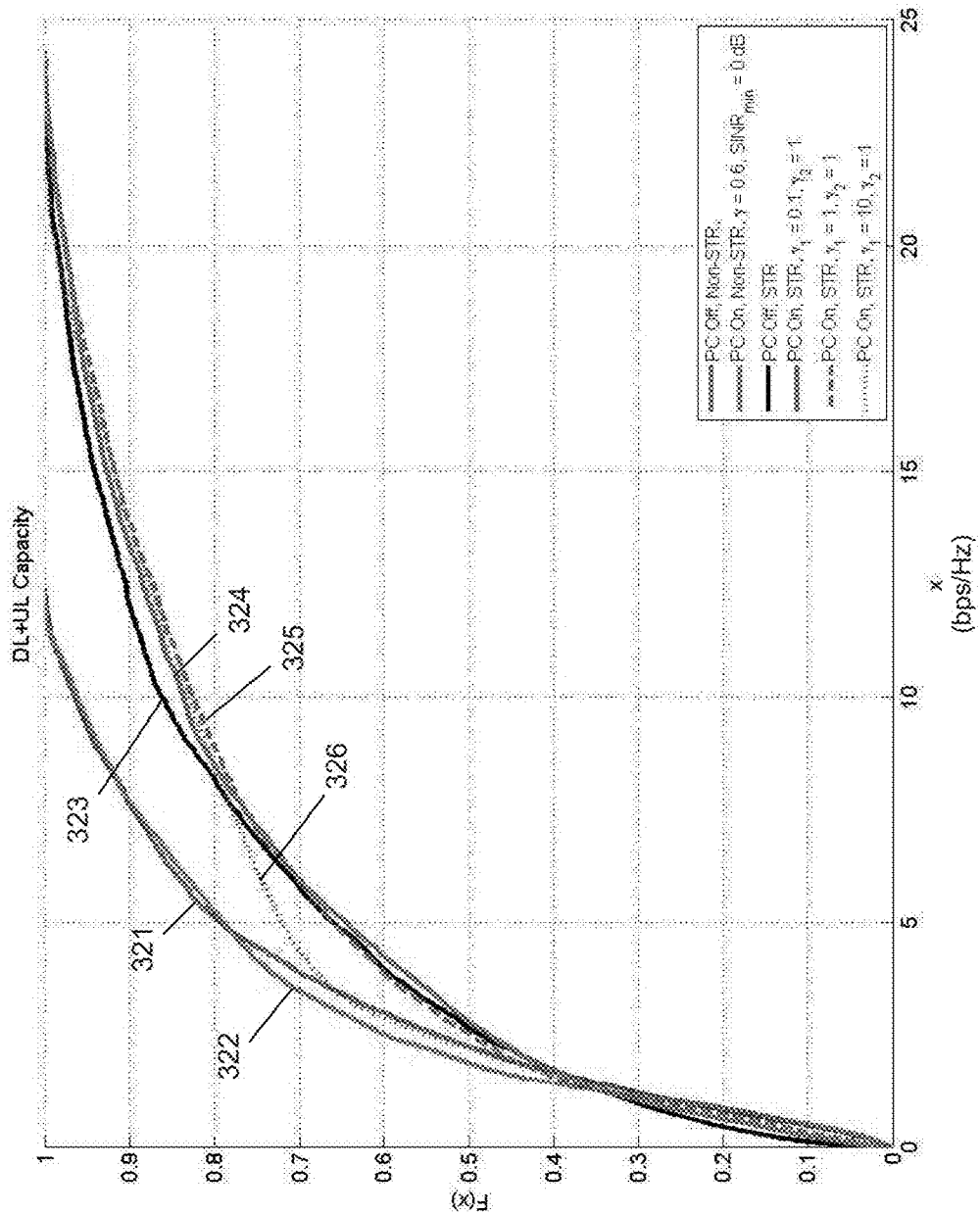

FIGS. 3A-3C respectively illustrate UL, DL and UL+DL spectral efficiencies for different values of $\gamma_1$ and $\gamma_2$ based on geometric SINRs (i.e., long-term averages of SINRs) and under the usual system evaluation methodology assumptions set forth in 3GPP TR 36.814 Technical Specification Group Radio Access Network. In FIGS. 3A-3C, the abscissas (x) are the spectral efficiency (SE) in bps/Hz, and the ordinates (F(x)) are the probability that the spectral efficiency is less than or equal to the value x of the spectral efficiency.

In FIG. 3A, curve 301 represents a non-STR configuration (half-duplex) in which Power Control (PC) off. Curve 302 represents a non-STR configuration in which Power Control (PC) is on, and $\gamma$=0.6, and $SINR_{min}$=0 dB. Curve 303 represents an STR (full-duplex) configuration in which Power Control is off. Curve 304 represents an STR configuration in which Power Control (PC) is on, $\gamma_1$=0.1, and $\gamma_2$=1. Curve 305 represents an STR configuration in which Power Control (PC) is on, $\gamma_1$=1, and $\gamma_2$=1. Curve 306 represents an STR configuration in which Power Control (PC) is on, $\gamma_1$=10, and $\gamma_2$=1.

In FIG. 3B, curve 311 represents a non-STR configuration (half-duplex) in which Power Control (PC) off. Curve 312 represents a non-STR configuration in which Power Control (PC) is on, and $\gamma$=0.6, and $SINR_{min}$=0 dB. Curves 311 and 312 substantially overlap. Curve 313 represents an STR (full-duplex) configuration in which Power Control is off. Curve 314 represents an STR configuration in which Power Control (PC) is on, $\gamma_1$=0.1, and $\gamma_2$=1. Curve 315 represents an STR configuration in which Power Control (PC) is on, $\gamma_1$=1, and $\gamma_2$=1. Curve 316 represents an STR configuration in which Power Control (PC) is on, $\gamma_1$=10, and $\gamma_2$=1.

In FIG. 3C, curve 321 represents a non-STR configuration (half-duplex) in which Power Control (PC) off. Curve 322 represents a non-STR configuration in which Power Control (PC) is on, and $\gamma$=0.6, and $SINR_{min}$=0 dB. Curve 323 represents an STR (full-duplex) configuration in which Power Control is off. Curve 324 represents an STR configuration in which Power Control (PC) is on, $\gamma_1$=0.1, and $\gamma_2$=1. Curve 325 represents an STR configuration in which Power Control (PC) is on, $\gamma_1=1$, and $\gamma_2=1$. Curve 326 represents an STR configuration in which Power Control (PC) is on, $\gamma_1=10$, and $\gamma_2=1$.

Figure 4:
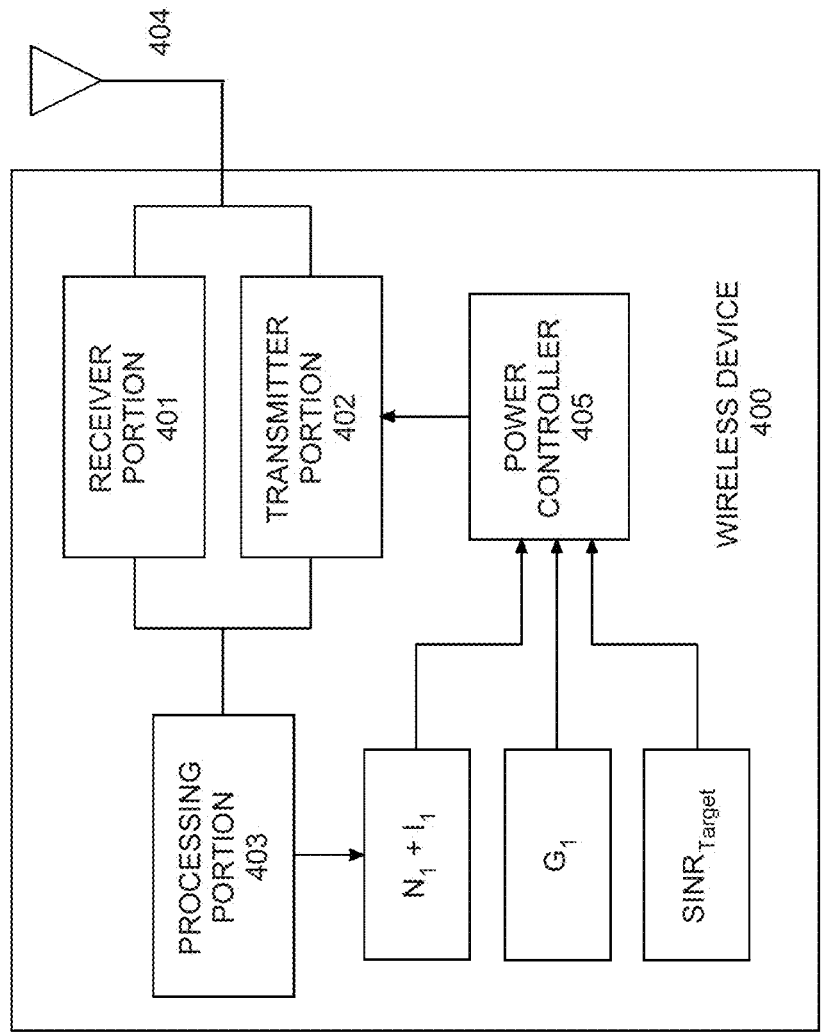
FIG. 4 depicts a functional block diagram of an exemplary embodiment of a wireless station according to the subject matter disclosed herein.

FIG. 4 depicts a functional block diagram of an exemplary embodiment of a wireless station WD 400 according to the subject matter disclosed herein. WD 400 comprises a receiver portion 401, a transmitter portion 402, a processing portion 403, an antenna 404, and a power controller 405. Receiver portion 401 and transmitter portion 402 are coupled in a well-known manner to processing portion 403 and to one or more antennas 404. According to the subject matter disclosed herein, UL noise-plus-interference level ($N_1+I_1$) at the home base station is received from the home base station (FIG. 2) by antenna 404 and receiver portion 401 by either an open-loop or a closed-loop feedback technique. Processing portion 403 extracts in a well-known manner the $N_1+I_1$ at the home base station that is received from the home base station. The $N_1+I_1$ information is passed to power controller 405 along with gain $G_1$ information and $SINR_{Target}$ information. Gain $G_1$ information can be calculated (approximately) based on half-duplex DL signal-to-interference ratio $SIR_{DL,atUE}^{Non-STR}$ (Equation (13)) and full-duplex DL signal to UE-UE interference ratio $SI_{US-UE}R_{DL,atUE}^{STR}$ (Equation (14)). $SINR_{Target}$ is determined based on Equation (15). Power controller 405, which is coupled to transmitter portion 402, controls the UL transmit power output from transmitter portion 402 based on Equation (16). Wireless device 400 could be physically embodied as, but not limited to, a subscriber station (SS), a mobile station (MS), a Machine-to-Machine-type (M2M-type) device, customer premises equipment (CPE), a User Equipment (UE), a notebook-type computer, a tablet-type device, a cellular telephone, a smart-type device, a smartphone, a personal digital assistant, or the like as described herein.

Figure 5:
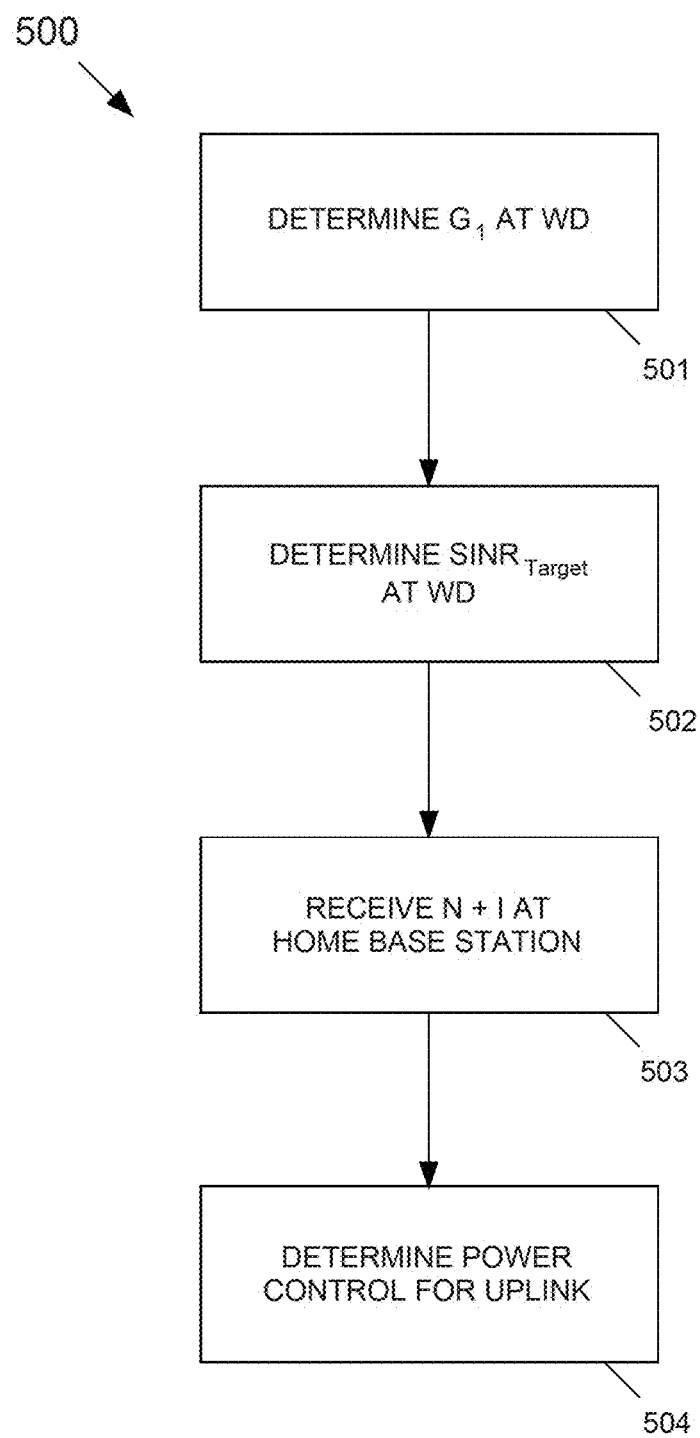
FIG. 5 depicts a flow diagram for managing WD-WD inference in full-duplex systems according to the subject matter disclosed herein.

FIG. 5 depicts a flow diagram 500 for managing WD-WD inference in full-duplex systems according to the subject matter disclosed herein. At 501, antenna gain $G_1$ is determined at the wireless device. At 502, the wireless device determines $SINR_{Target}$. At 503, the wireless device receives $N_1+I_1$ at the home base station for the wireless device by either open-loop or closed-loop feedback. At 504, the wireless device determines the power control level for the uplink between the wireless device and the home base station.

Figure 6:
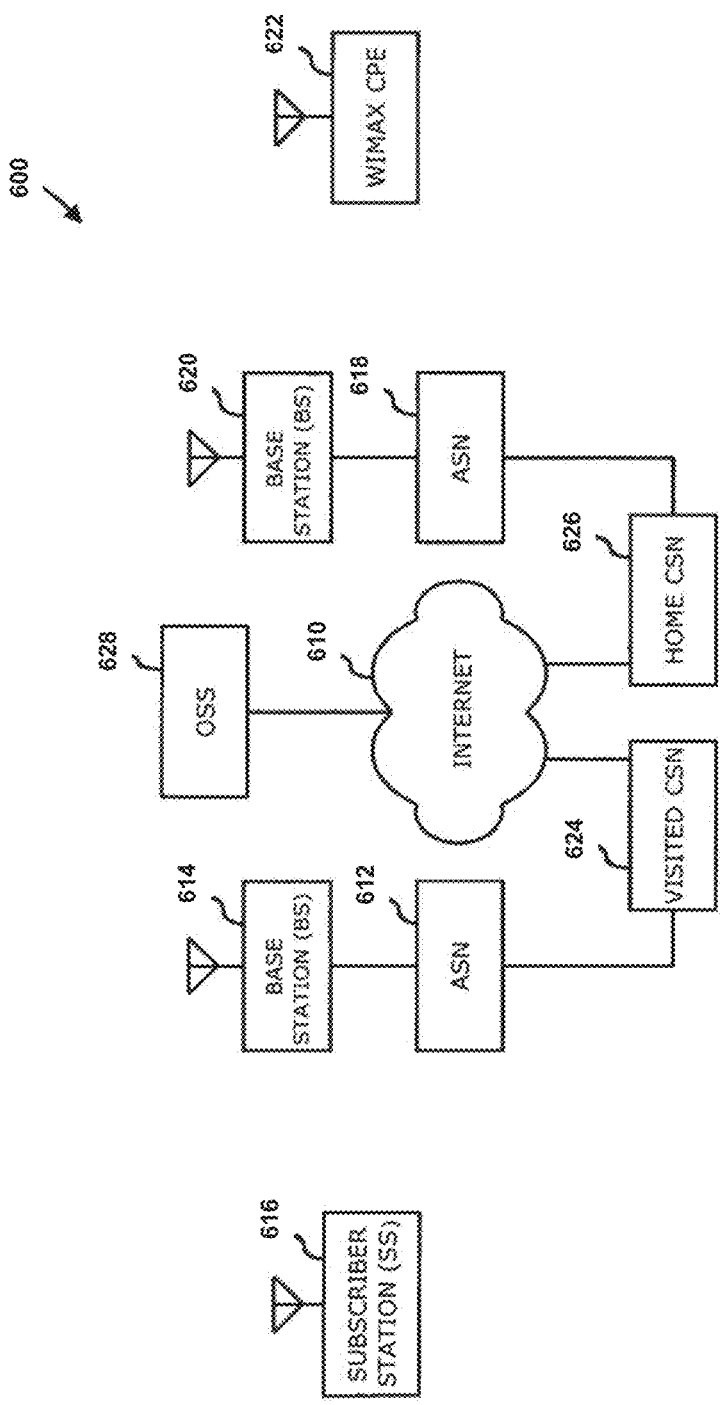
FIG. 6 depicts a block diagram of an exemplary configuration of a wireless network in accordance with one or more exemplary embodiments disclosed herein.

FIG. 6 depicts a block diagram of an exemplary configuration of a wireless network 600 in accordance with one or more exemplary embodiments disclosed herein. One or more of the elements of wireless network 600 may be capable of an uplink-transmit-power control technique that reduces interference experienced at other wireless devices according to the subject matter disclosed herein. As shown in FIG. 6, network 600 may be an Internet-Protocol-type (IP-type) network comprising an Internet-type network 610, or the like, that is capable of supporting mobile wireless access and/or fixed wireless access to Internet 610. In one or more exemplary embodiments, network 600 may be in compliance with a Worldwide Interoperability for Microwave Access (WiMAX) standard or future generations of WiMAX, and in one particular embodiment may be in compliance with an Institute for Electrical and Electronics Engineers 802.16-based standard (for example, IEEE 802.16e), or an IEEE 802.11-based standard (for example, IEEE 802.11a/b/g/n standard), and so on. In one or more alternative exemplary embodiments, network 600 may be in compliance with a 3rd Generation Partnership Project Long Term Evolution (3GPP LTE), a 3GPP2 Air Interface Evolution (3GPP2 AIE) standard and/or a 3GPP LTE-Advanced standard. In general, network 600 may comprise any type of orthogonal-frequency-division-multiple-access-based (OFDMA-based) wireless network, for example, a WiMAX compliant network, a Wi-Fi Alliance Compliant Network, a digital subscriber-line-type (DSL-type) network, an asymmetric-digital-subscriber-line-type (ADSL-type) network, an Ultra-Wideband (UWB) compliant network, a Wireless Universal Serial Bus (USB) compliant network, a 4th Generation (4G) type network, and so on, and the scope of the claimed subject matter is not limited in these respects. As an example of mobile wireless access, access service network (ASN) 612 is capable of coupling with base station (BS) 614 to provide wireless communication between subscriber station (SS) 616 (also referred to herein as a wireless terminal) and Internet 610. In one exemplary embodiment, subscriber station 616 may comprise a mobile-type device or information-handling system capable of wirelessly communicating via network 600, for example, a notebook-type computer, a cellular telephone, a personal digital assistant, an M2M-type device, or the like. In another exemplary embodiment, subscriber station is capable of providing an uplink-transmit-power control technique that reduces interference experienced at other wireless devices according to the subject matter disclosed herein. ASN 612 may implement profiles that are capable of defining the mapping of network functions to one or more physical entities on network 600. Base station 614 may comprise radio equipment to provide radio-frequency (RF) communication with subscriber station 616, and may comprise, for example, the physical layer (PHY) and media access control (MAC) layer equipment in compliance with an IEEE 802.16e-type standard. Base station 614 may further comprise an IP backplane to couple to Internet 610 via ASN 612, although the scope of the claimed subject matter is not limited in these respects.

Network 600 may further comprise a visited connectivity service network (CSN) 624 capable of providing one or more network functions including, but not limited to, proxy and/or relay type functions, for example, authentication, authorization and accounting (AAA) functions, dynamic host configuration protocol (DHCP) functions, or domain-name service controls or the like, domain gateways, such as public switched telephone network (PSTN) gateways or Voice over Internet Protocol (VoIP) gateways, and/or Internet-Protocol-type (IP-type) server functions, or the like. These are, however, merely example of the types of functions that are capable of being provided by visited CSN or home CSN 626, and the scope of the claimed subject matter is not limited in these respects. Visited CSN 624 may be referred to as a visited CSN in the case, for example, in which visited CSN 624 is not pan of the regular service provider of subscriber station 616, for example, in which subscriber station 616 is roaming away from its home CSN, such as home CSN 626, or, for example, in which network 600 is part of the regular service provider of subscriber station, but in which network 600 may be in another location or state that is not the main or home location of subscriber station 616. In a fixed wireless arrangement, WiMAX-type customer premises equipment (CPE) 622 may be located in a home or business to provide home or business customer broadband access to Internet 610 via base station 620, ASN 618, and home CSN 626 in a manner similar to access by subscriber station 616 via base station 614. ASN 612, and visited CSN 624, a difference being that WiMAX CPE 622 is generally disposed in a stationary location, although it may be moved to different locations as needed, whereas subscriber station may be utilized at one or more locations if subscriber station 616 is within range of base station 614 for example. It should be noted that CPE 622 need not necessarily comprise a WiMAX-type terminal, and may comprise other types of terminals or devices compliant with one or more standards or protocols, for example, as discussed herein, and in general may comprise a fixed or a mobile device. Moreover, in one exemplary embodiment, CPE 622 is capable of providing an uplink-transmit-power control technique that reduces interference experienced at other wireless devices according to the subject matter disclosed herein. In accordance with one or more embodiments, operation support system (OSS) 628 may be part of network 600 to provide management functions for network 600 and to provide interfaces between functional entities of network 600. Network 600 of FIG. 6 is merely one type of wireless network showing a certain number of the components of network 600; however, the scope of the claimed subject matter is not limited in these respects.

Figure 7:
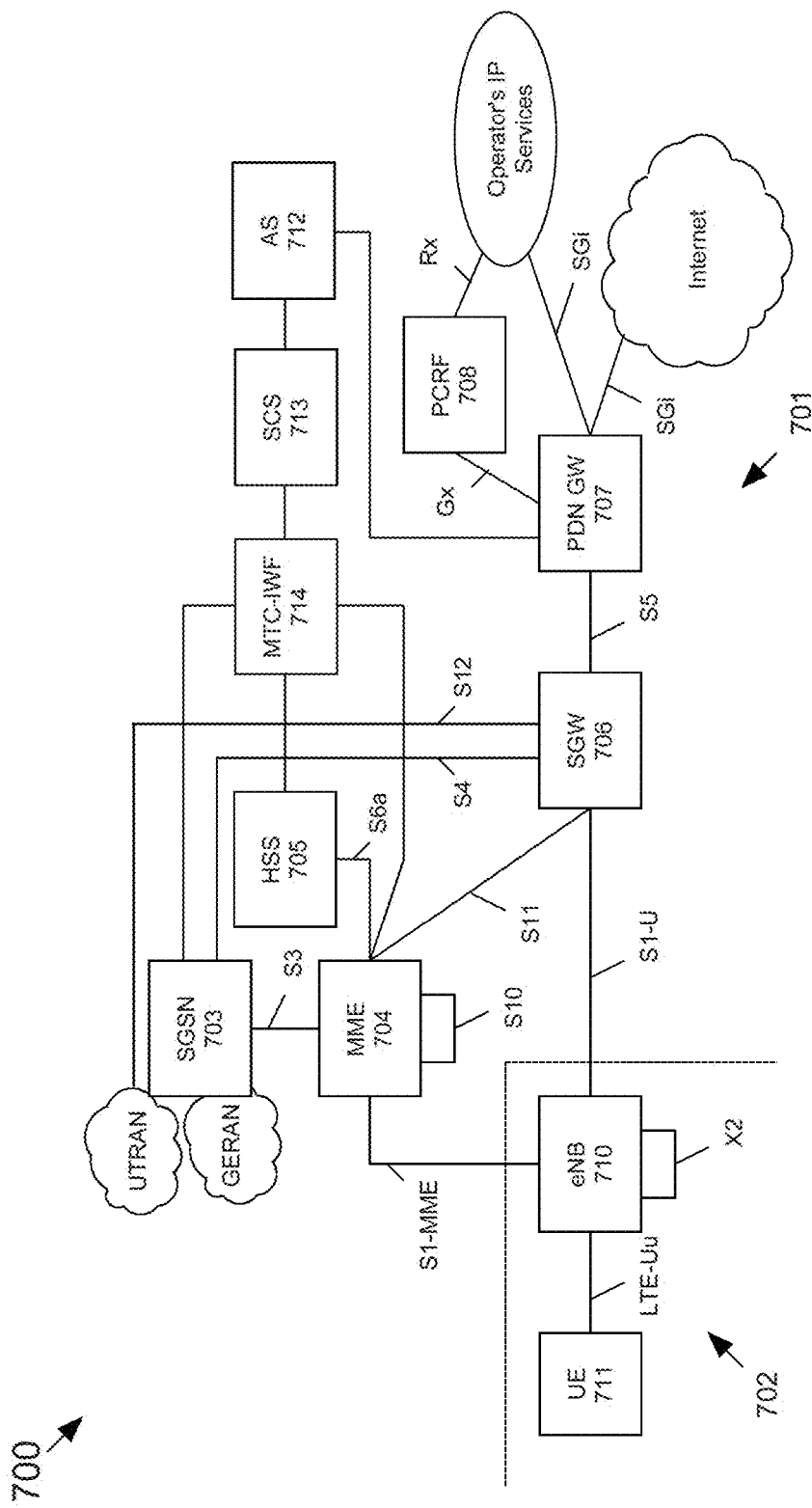
FIG. 7 shows an exemplary block diagram of the overall architecture of a 3GPP LTE network that includes one or more devices that are capable of providing an uplink-transmit-power control technique that reduces interference experienced at other wireless devices according to the subject matter disclosed herein.

FIG. 7 shows an exemplary block diagram of the overall architecture of a 3GPP LTE network 700 that includes one or more devices that are capable of providing an uplink-transmit-power control technique that reduces interference experienced at other wireless devices according to the subject matter disclosed herein. FIG. 7 also generally shows exemplary network elements and exemplary standardized interfaces. At a high level, network 700 comprises a core network (CN) 701 (also referred to as an evolved Packet System (EPC)), and an air-interface access network E-UTRAN 702. CN 701 is responsible for the overall control of the various User Equipment (UE) connected to the network and establishment of the bearers. CN 701 may include functional entities, such as a home agent HA and/or an ANDSF server or entity, although not explicitly depicted. E-UTRAN 702 is responsible for all radio-related functions.

The main exemplary logical nodes of CN 701 include, but are not limited to, a Serving GPRS Support Node 703, the Mobility Management Entity 704, a Home Subscriber Server (HSS) 705, a Serving Gate (SGW) 706, a PDN Gateway 707 and a Policy and Charging Rules Function (PCRF) Manager 708. The functionality of each of the network elements of CN 701 is well known and is not described herein. Each of the network elements of CN 701 are interconnected by well-known exemplary standardized interfaces, some of which are indicated in FIG. 7, such as interfaces S3, S4, S5, etc., although not described herein.

While CN 701 includes many logical nodes, the E-UTRAN access network 702 is formed by at least one node, such as evolved NodeB (base station (BS), eNB or eNodeB) 710, which connects to one or more User Equipment (UE) 711, of which only one is depicted in FIG. 7, UE 711 is also referred to herein as a wireless device (WD)) and/or a subscriber station (SS), and can include an M2M-type device. In one exemplary embodiment, UE 711 is capable of providing an uplink-transmit-power control technique that reduces interference experienced at other wireless devices according to the subject matter disclosed herein. In one exemplary configuration, a single cell of an E-UTRAN access network 702 provides one substantially localized geographical transmission point (having multiple antenna devices) that provides access to one or more UEs. In another exemplary configuration, a single cell of an E-UTRAN access network 702 provides multiple geographically substantially isolated transmission points (each having one or more antenna devices) with each transmission point providing access to one or more UEs simultaneously and with the signaling bits defined for the one cell so that all UEs share the same spatial signaling dimensioning. For normal user traffic (as opposed to broadcast), there is no centralized controller in E-UTRAN; hence the E-UTRAN architecture is said to be flat. The eNBs are normally interconnected with each other by an interface known as "X2" and to the EPC by an S1 interface. More specifically, an eNB is connected to MME 704 by an S1-MME interface and to SGW 706 by an S1-U interface. The protocols that run between the eNBs and the UEs are generally referred to as the "AS protocols." Details of the various interfaces are well known and not described herein.

The eNB 710 hosts the PHYsical (PHY), Medium Access Control (MAC), Radio Link Control (RLC), and Packet Data Control Protocol (PDCP) layers, which are not shown in FIG. 7, and which include the functionality of user-plane header-compression and encryption. The eNB 710 also provides Radio Resource Control (RRC) functionality corresponding to the control plane, and performs many functions including radio resource management, admission control, scheduling, enforcement of negotiated Up Link (UL) QoS, cell information broadcast, ciphering/deciphering of user and control plane data, and compression/decompression of DL/UL user plane packet headers.

The RRC layer in eNB 710 covers all functions related to the radio bearers, such as radio bearer control, radio admission control, radio mobility control, scheduling and dynamic allocation of resources to UEs in both uplink and downlink, header compression for efficient use of the radio interface, security of all data sent over the radio interface, and connectivity to the EPC. The RRC layer makes handover decisions based on neighbor cell measurements sent by UE 711, generates pages for UEs 711 over the air, broadcasts system information, controls UE measurement reporting, such as the periodicity of Channel Quality Information (CQI) reports, and allocates cell-level temporary identifiers to active UEs 711. The RRC layer also executes transfer of UE context from a source eNB to a target eNB during handover, and provides integrity protection for RRC messages. Additionally, the RRC layer is responsible for the setting up and maintenance of radio bearers.

Figure 8:
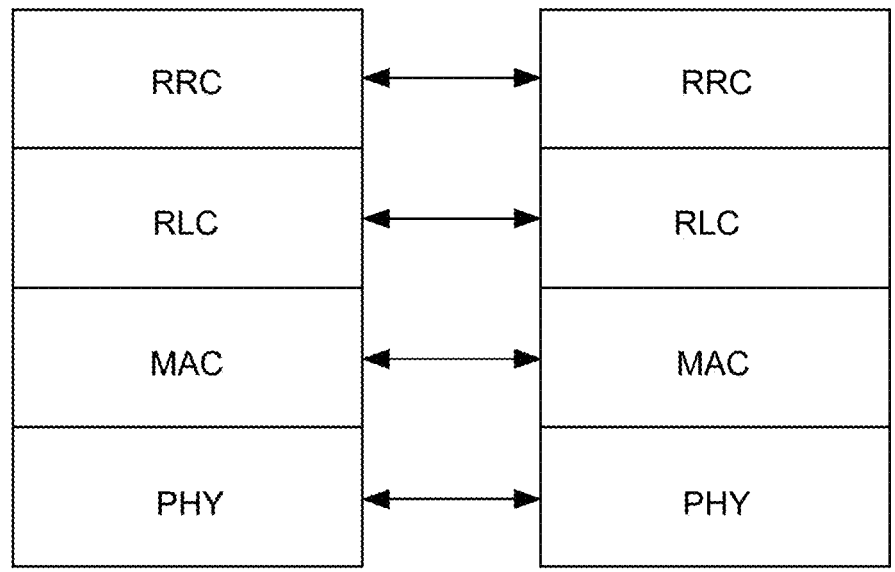
FIGS. 8 and 9 respectively depict exemplary radio interface protocol structures between a UE and an eNodeB that are based on a 3GPP-type radio access network standard and that is capable of providing an uplink-transmit-power control technique that reduces interference experienced at other wireless devices according to the subject matter disclosed herein.
Figure 9:
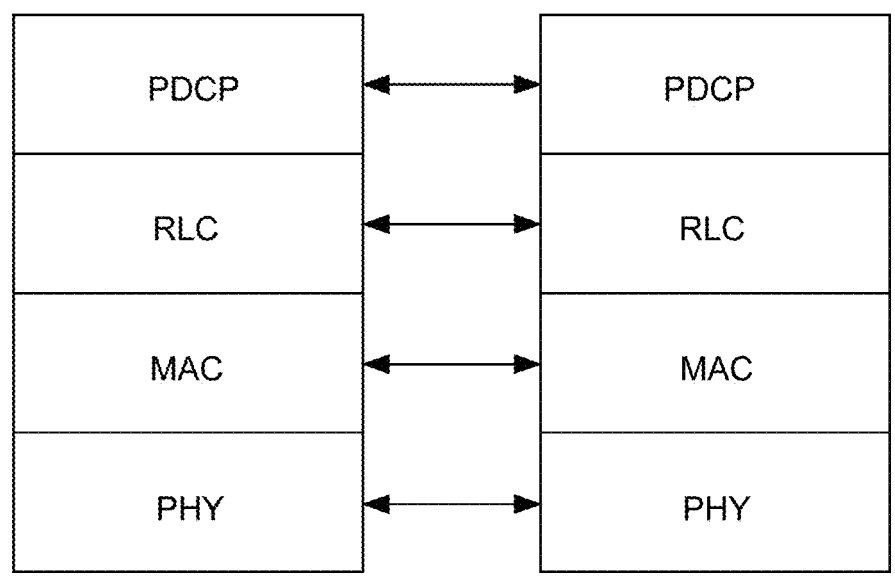

FIGS. 8 and 9 respectively depict exemplary radio interface protocol structures between a UE and an eNodeB that are based on a 3GPP-type radio access network standard and that is capable of providing an uplink-transmit-power control technique that reduces interference experienced at other wireless devices according to the subject matter disclosed herein. More specifically, FIG. 8 depicts individual layers of a radio protocol control plane and FIG. 9 depicts individual layers of a radio protocol user plane. The protocol layers of FIGS. 8 and 9 can be classified into an L1 layer (first layer), an L2 layer (second layer) and an L3 layer (third layer) on the basis of the lower three layers of the OSI reference model widely known in communication systems.

The physical (PHY) layer, which is the first layer (L1), provides an information transfer service to an upper layer using a physical channel. The physical layer is connected to a Medium Access Control (MAC) layer, which is located above the physical layer, through a transport channel. Data is transferred between the MAC layer and the PHY layer through the transport channel. A transport channel is classified into a dedicated transport channel and a common transport channel according to whether or not the channel is shared. Data transfer between different physical layers, specifically between the respective physical layers of a transmitter and a receiver is performed through the physical channel.

A variety of layers exist in the second layer (L2 layer). For example, the MAC layer maps various logical channels to various transport channels, and performs logical-channel multiplexing for mapping various logical channels to one transport channel. The MAC layer is connected to the Radio Link Control (RLC) layer serving as an upper layer through a logical channel. The logical channel can be classified into a control channel for transmitting information of a control plane and a traffic channel for transmitting information of a user plane according to categories of transmission information.

The RLC layer of the second layer (L2) performs segmentation and concatenation on data received from an upper layer, and adjusts the size of data to be suitable for a lower layer transmitting data to a radio interval. In order to guarantee various Qualities of Service (QoSs) requested by respective radio bearers (RBs), three operation modes, i.e., a Transparent Mode (TM), an Unacknowledged Mode (UM), and an Acknowledged Mode (AM), are provided. Specifically, an AM RLC performs a retransmission function using an Automatic Repeat and Request (ARQ) function so as to implement reliable data transmission.

A Packet Data Convergence Protocol (PDCP) layer of the second layer (L2) performs a header compression function to reduce the size of an IP packet header having relatively large and unnecessary control information in order to efficiently transmit IP packets, such as IPv4 or IPv6 packets, in a radio interval with a narrow bandwidth. As a result, only information required for a header part of data can be transmitted, so that transmission efficiency of the radio interval can be increased. In addition, in an LTE-based system, the PDCP layer performs a security function that includes a ciphering function for preventing a third party from eavesdropping on data and an integrity protection function for preventing a third party from handling data.

A Radio Resource Control (RRC) layer located at the top of the third layer (L3) is defined only in the control plane and is responsible for control of logical, transport, and physical channels in association with configuration, re-configuration and release of Radio Bearers (RBs). The RB is a logical path that the first and second layers (L1 and L2) provide for data communication between the UE and the UTRAN. Generally, Radio Bearer (RB) configuration means that a radio protocol layer needed for providing a specific service, and channel characteristics are defined and their detailed parameters and operation methods are configured. The Radio Bearer (RB) is classified into a Signaling RB (SRB) and a Data RB (DRB). The SRB is used as a transmission passage of RRC messages in the C-plane, and the DRB is used as a transmission passage of user data in the U-plane.

A downlink transport channel for transmitting data from the network to the UE may be classified into a Broadcast Channel (BCH) for transmitting system information and a downlink Shared Channel (SCH) for transmitting user traffic or control messages. Traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages.

Downlink physical channels for transmitting information transferred to a downlink transport channel to a radio interval between the UE and the network are classified into a Physical Broadcast Channel (PBCH) for transmitting BCH information, a Physical Multicast Channel (PMCH) for transmitting MCH information, a Physical Downlink Shared Channel (PDSCH) for transmitting downlink SCH information, and a Physical Downlink Control Channel (PDCCH) (also called a DL L1/L2 control channel) for transmitting control information, such as DL/UL Scheduling Grant information, received from first and second layers (L1 and L2). In the meantime, uplink physical channels for transmitting information transferred to an uplink transport channel to a radio interval between the UE and the network are classified into a Physical Uplink Shared Channel (PUSCH) for transmitting uplink SCH information, a Physical Random Access Channel for transmitting RACH information, and a Physical Uplink Control Channel (PUCCH) for transmitting control information, such as Hybrid Automatic Repeat Request (HARQ) ACK or NACK Scheduling Request (SR) and Channel Quality Indicator (CQI) report information, received from first and second layers (L1 and L2).

Figure 10:
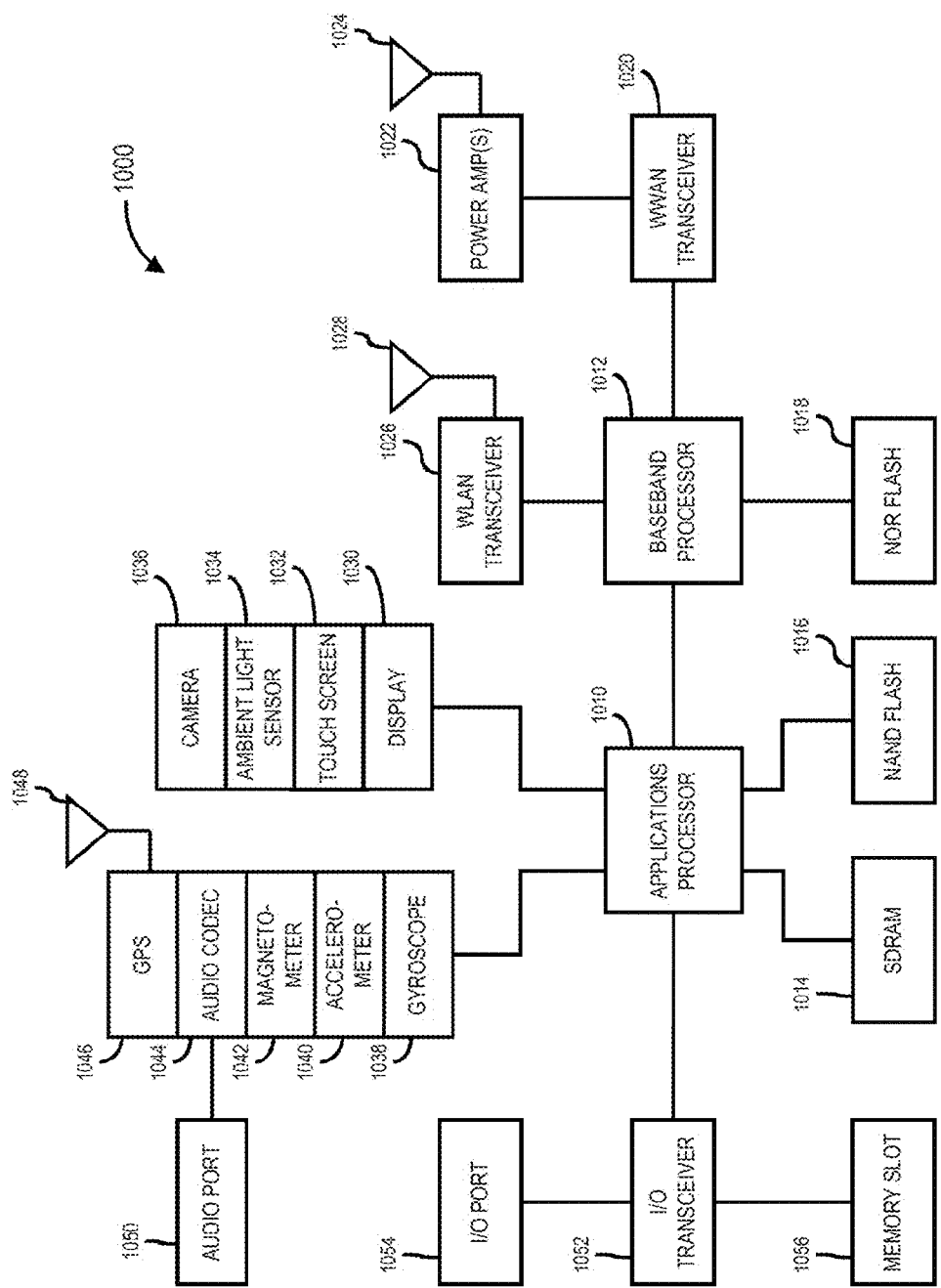
FIG. 10 depicts an exemplary functional block diagram of an information-handling system that is capable of providing an uplink-transmit-power control technique that reduces interference experienced at other wireless devices according to the subject matter disclosed herein.

FIG. 10 depicts an exemplary functional block diagram of an information-handling system 1000 that is capable of providing an uplink-transmit-power control technique that reduces interference experienced at other wireless devices according to the subject matter disclosed herein. Information-handling system 1000 of FIG. 10 may tangibly embody one or more of any of the exemplary devices, exemplary network elements and/or functional entities of the network as shown in and described with respect to FIG. 4, FIG. 6, and/or core network 701 as shown in and described with respect to FIG. 7. In one exemplary embodiment, information-handling system 1000 may represent the components of wireless device 400, subscriber station 616, CPE 622, base stations 614 and 620, eNB 710, and/or UE 711, with greater or fewer components depending on the hardware specifications of the particular device or network element. In another exemplary embodiment, information-handling system may provide M2M-type device capability. In yet another exemplary embodiment, information-handling system 1000 is capable of providing an uplink-transmit-power control technique that reduces interference experienced at other wireless devices according to the subject matter disclosed herein. Although information-handling system 1000 represents one example of several types of computing platforms, information-handling system 1000 may include more or fewer elements and/or different arrangements of elements than shown in FIG. 8, and the scope of the claimed subject matter is not limited in these respects.

In one or more embodiments, information-handling system 1000 may comprise one or more applications processor 1010 and a baseband processor 1012. Applications processor 1010 may be utilized as a general purpose processor to run applications and the various subsystems for information handling system 1000, and to capable of providing an uplink-transmit-power control technique that reduces interference experienced at other wireless devices according to the subject matter disclosed herein. Applications processor 1010 may include a single core or alternatively may include multiple processing cores wherein one or more of the cores may comprise a digital signal processor or digital signal processing core. Furthermore, applications processor 1010 may include a graphics processor or coprocessor disposed on the same chip, or alternatively a graphics processor coupled to applications processor 1010 may comprise a separate, discrete graphics chip. Applications processor 1010 may include on-board memory, such as cache memory, and further may be coupled to external memory devices such as synchronous dynamic random access memory (SDRAM) 1014 for storing and/or executing applications, such as capable of providing an uplink-transmit-power control technique that reduces interference experienced at other wireless devices according to the subject matter disclosed herein. During operation, and NAND flash 1016 for storing applications and/or data even when information handling system 1000 is powered off.

In one exemplary embodiment, a list of candidate nodes may be stored in SDRAM 1014 and/or NAND flash 1016. Further, applications processor 1010 may execute computer-readable instructions stored in SDRAM 1014 and/or NAND flash 1016 that result in an uplink-transmit-power control technique that reduces interference experienced at other wireless devices according to the subject matter disclosed herein.

In one exemplary embodiment, baseband processor 1012 may control the broadband radio functions for information-handling system 1000. Baseband processor 1012 may store code for controlling such broadband radio functions in a NOR flash 1018. Baseband processor 1012 controls a wireless wide area network (WWAN) transceiver 1020 which is used for modulating and/or demodulating broadband network signals, for example, for communicating via a 3GPP LTE network or the like as discussed herein with respect to FIG. 10. The WWAN transceiver 1020 couples to one or more power amplifiers 1022 that are respectively coupled to one or more antennas 1024 for sending and receiving radio-frequency signals via the WWAN broadband network. The baseband processor 1012 also may control a wireless local area network (WLAN) transceiver 1026 coupled to one or more suitable antennas 1028 and that may be capable of communicating via a Bluetooth-based standard, an IEEE 802.11-based standard, an IEEE 802.16-based standard, an IEEE 802.18-based wireless network standard, a 3GPP-based protocol wireless network, a Third Generation Partnership Project Long Term Evolution (3GPP LTE) based wireless network standard, a 3GPP2 Air Interface Evolution (3GPP2 AIE) based wireless network standard, a 3GPP-LTE-Advanced-based wireless network, a UMTS-based protocol wireless network, a CDMA2000-based protocol wireless network, a GSM-based protocol wireless network, a cellular-digital-packet-data-based (CDPD-based) protocol wireless network, a Mobitex-based protocol wireless network, a Near-Field-Communications-based (NFC-based) link, a WiGig-based network, a ZigBee-based network, or the like. It should be noted that these are merely exemplary implementations for applications processor 1010 and baseband processor 1012, and the scope of the claimed subject matter is not limited in these respects. For example, any one or more of SDRAM 1014, NAND flash 1016 and/or NOR flash 1018 may comprise other types of memory technology, such as magnetic-based memory, chalcogenide-based memory, phase-change-based memory, optical-based memory, or ovonic-based memory, and the scope of the claimed subject matter is not limited in this respect.

In one or more embodiments, applications processor 1010 may drive a display 1030 for displaying various information or data, and may further receive touch input from a user via a touch screen 1032, for example, via a finger or a stylus. In one exemplary embodiment, screen 1032 display a menu and/or options to a user that are selectable via a finger and/or a stylus for entering information into information-handling system 1000.

An ambient light sensor 1034 may be utilized to detect an amount of ambient light in which information-handling system 1000 is operating, for example, to control a brightness or contrast value for display 1030 as a function of the intensity of ambient light detected by ambient light sensor 1034. One or more cameras 1036 may be utilized to capture images that are processed by applications processor 1010 and/or at least temporarily stored in NAND flash 1016. Furthermore, applications processor may be coupled to a gyroscope 1038, accelerometer 1040, magnetometer 1042, audio coder/decoder (CODEC) 1044, and/or global positioning system (GPS) controller 1046 coupled to an appropriate GPS antenna 1048, for detection of various environmental properties including location, movement, and/or orientation of information-handling system 1000. Alternatively, controller 1046 may comprise a Global Navigation Satellite System (GNSS) controller. Audio CODEC 1044 may be coupled to one or more audio ports 1050 to provide microphone input and speaker outputs either via internal devices and/or via external devices coupled to information-handling system via the audio ports 1050, for example, via a headphone and microphone jack. In addition, applications processor 1010 may couple to one or more input/output (I/O) transceivers 1052 to couple to one or more I/O ports 1054 such as a universal serial bus (USB) port, a high-definition multimedia interface (HDMI) port, a serial port, and so on. Furthermore, one or more of the I/O transceivers 1052 may couple to one or more memory slots 1056 for optional removable memory, such as secure digital (SD) card or a subscriber identity module (SIM) card, although the scope of the claimed subject matter is not limited in these respects.

Figure 11:
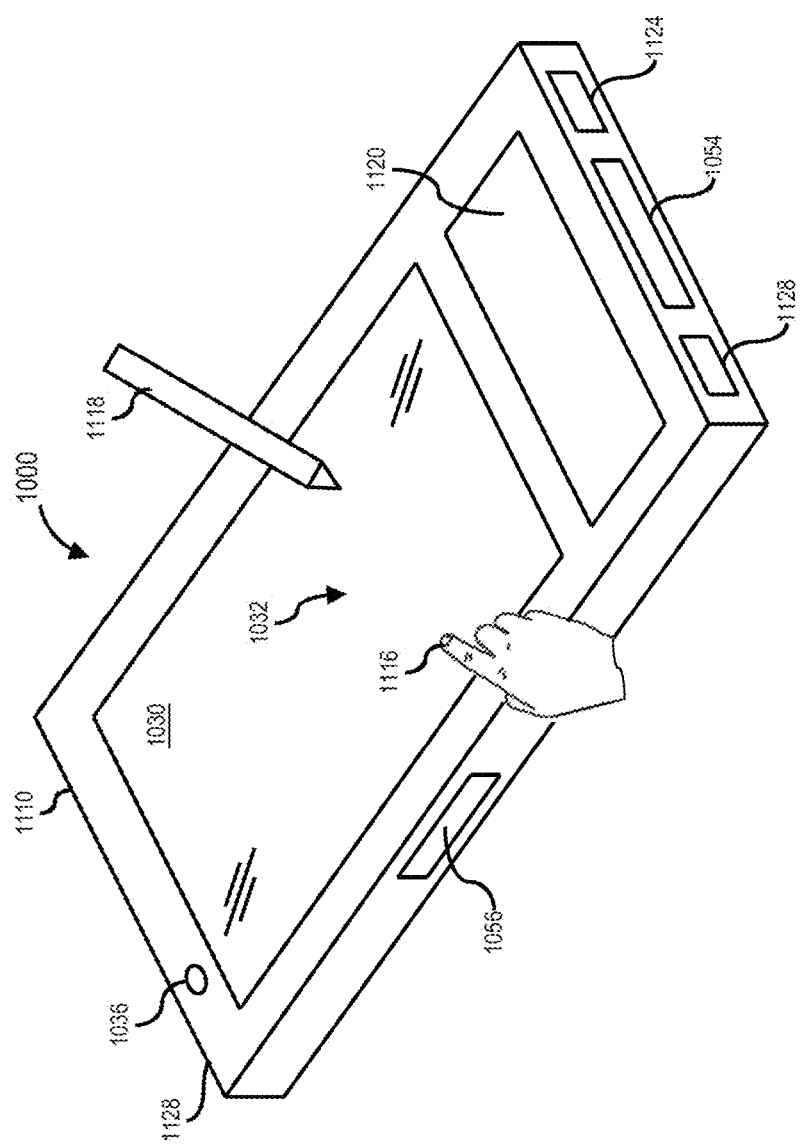
FIG. 11 depicts an isometric view of an exemplary embodiment of the information-handling system of FIG. 8 that optionally may include a touch screen in accordance with one or more embodiments disclosed herein.

FIG. 11 depicts an isometric view of an exemplary embodiment of the information-handling system of FIG. 10 that optionally may include a touch screen in accordance with one or more embodiments disclosed herein. FIG. 11 shows an example implementation of information-handling system 1000 of FIG. 10 tangibly embodied as a cellular telephone, smartphone, smart-type device, or tablet-type device or the like, that is capable of providing an uplink-transmit-power control technique that reduces interference experienced at other wireless devices according to the subject matter disclosed herein. In one or more embodiments, the information-handling system 1000 may comprise any one of the infrastructure nodes, wireless device 400, subscriber station 616, CPE 622, mobile station UE 711 of FIG. 7, and/or an M2M-type device, although the scope of the claimed subject matter is not limited in this respect. The information-handling system 1000 may comprise a housing 1110 having a display 1030 that may include a touch screen 1032 for receiving tactile input control and commands via a finger 1116 of a user and/or a via stylus 1118 to control one or more applications processors 1010. The housing 1110 may house one or more components of information-handling system 1000, for example, one or more applications processors 1010, one or more of SDRAM 1014, NAND flash 1016, NOR flash 1018, baseband processor 1012, and/or WWAN transceiver 1020. The information-handling system 1000 further may optionally include a physical actuator area 1120 which may comprise a keyboard or buttons for controlling information-handling system 1000 via one or more buttons or switches. The information-handling system 1000 may also include a memory port or slot 1056 for receiving non-volatile memory, such as flash memory, for example, in the form of a secure digital (SD) card or a subscriber identity module (SIM) card. Optionally, the information-handling system 1000 may further include one or more speakers and/or microphones 1124 and a connection port 1054 for connecting the information-handling system 1000 to another electronic device, dock, display, battery charger, and so on. Additionally, information-handling system 1000 may include a headphone or speaker jack 1128 and one or more cameras 1036 on one or more sides of the housing 1110. It should be noted that the information-handling system 1000 of FIGS. 10 and 11 may include more or fewer elements than shown, in various arrangements, and the scope of the claimed subject matter is not limited in this respect.

Figure 12:
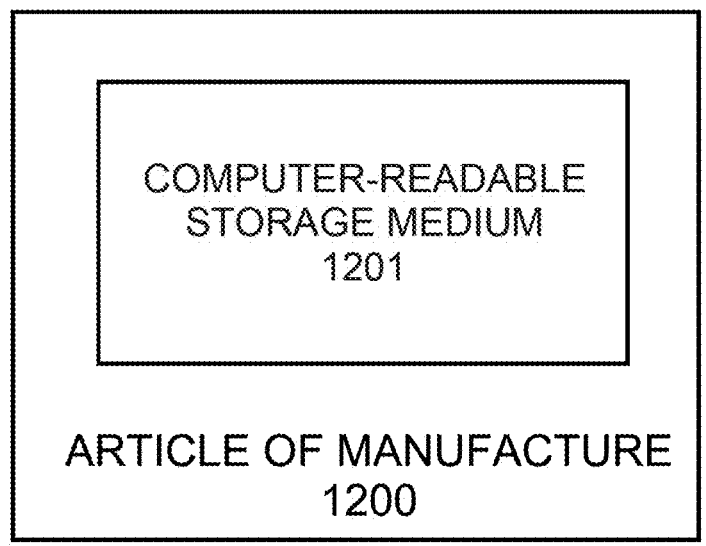
FIG. 12 depicts an exemplary embodiment of an article of manufacture comprising a non-transitory computer-readable storage medium having stored thereon computer-readable instructions that, when executed by a computer-type device, results in any of the various techniques and methods according to the subject matter disclosed herein.

FIG. 12 depicts an exemplary embodiment of an article of manufacture 1200 comprising a non-transitory computer-readable storage medium 1201 having stored thereon computer-readable instructions that, when executed by a computer-type device, results in any of the various techniques and methods according to the subject matter disclosed herein. Exemplary computer-readable storage mediums that could be used for computer-readable storage medium 1201 could be, but are not limited to, a semiconductor-based memory, an optically based memory, a magnetic-based memory, or a combination thereof.

These modifications can be made in light of the above detailed description. The terms used in the following claims should not be construed to limit the scope to the specific embodiments disclosed in the specification and the claims. Rather, the scope of the embodiments disclosed herein is to be determined by the following claims, which are to be construed in accordance with established doctrines of claim interpretation.

The invention claimed is:

1. A user equipment (UE) to transmit and receive full-duplex signals, comprising:
   a receiver capable of receiving a downlink signal in a full-duplex wireless network, the downlink signal containing information about a Noise plus Interference (N+I) level at a home evolved Node B (eNodeB) for the wireless device; and
   a processor coupled to the receiver and capable of determining an uplink power level based on the received information about the Noise plus Interference (N+I) level at the home eNodeB, an instantaneous antenna gain of the UE between the UE and the home eNodeB, and a target uplink Signal-to-Interference-plus-Noise Ratio ($SINR_{target}$) of an uplink signal of the UE to the home eNodeB, the $SINR_{Target}$ being based in part on the instantaneous antenna gain of the UE between the UE and the home eNodeB, an instantaneous antenna gain of the UE between the UE and another eNodeB, and an instantaneous antenna gain of the UE between the UE and another UE.

2. The UE according to claim 1, further comprising a transmitter capable of transmitting an uplink signal in accordance with the determined uplink power level.

3. The UE according to claim 1, wherein the determined uplink power level minimizes UE-to-UE interference caused by the uplink signal.

4. The UE according to claim 1, wherein the information about a Noise plus Interference (N+I) level at the home eNodeB is received by an open-loop feedback technique.

5. The UE according to claim 1, wherein the information about a Noise plus Interference (N+I) level at the home eNodeB is received by a closed-loop feedback technique.

6. The UE according to claim 1, wherein the target uplink $SINR_{target}$ at the home eNodeB comprises:

$$SINR_{target}(dB) \approx \begin{cases} 10\log_{10}\left(\max\left(10^{\frac{SINR_{Min}}{10}}, \gamma \times SIR_{DL,atUE}^{Non\text{-}STR} - 1\right)\right) & Non\text{-}STR \\ 10\log_{10}\left(\max\left(10^{\frac{SINR_{Min}}{10}}, \dfrac{1}{\gamma_1 \times \dfrac{1}{SIR_{DL,atUE}^{Non\text{-}STR}} + \gamma_2 \times \dfrac{1}{SI_{UE\text{-}UE}R_{DL,atUE}^{STR}}} - 1\right)\right) & STR \end{cases}$$

in which $SINR_{MIN}$ is a minimum uplink SINR in dB at the home eNodeB for cell-edge UEs, $$\gamma_1 = \frac{N_1 + I_1}{N_2 + I_2 + PG_2},$$

$$\gamma_2 = \frac{N_1 + I_1}{N_3 + I_3 + PG_3},$$

$$\gamma = \frac{1}{\gamma_1}$$

$$SIR_{DL,atUE}^{Non\text{-}STR} \approx \frac{G_1}{G_2},$$

$$SI_{UE\text{-}UE}R_{DL,atUE}^{STR} \approx K\frac{G_1}{G_3},$$

$N_1+I_1$ is the noise plus interference level at the home eNodeB, $N_2+I_2$ is the noise plus interference level at an eNodeB that is not the home eNodeB, and $N_3+I_1$ is the noise plus interference level at another UE, P is the uplink transmit power at the UE, $G_1$ comprises the instantaneous antenna gain between the UE and the home eNodeB of the wireless device, $G_2$ comprises an instantaneous antenna gain between the UE and an eNodeB that is not the home eNodeB of the UE, and $G_3$ comprises an instantaneous antenna gain between the UE and another UE, and K is the sum of the UL spectral efficiency at the another UE and the DL spectral efficiency at the UE, and in which K is not function of P.

7. The UE according to claim 1, wherein the UE comprises a cellular telephone, smartphone, smart-type device, or tablet-type device.

8. The UE according to claim 6, wherein the UE further comprising a touchscreen display capable of receiving input information from a touch of a user or a stylus.

9. The UE according to claim 1, wherein the UE further comprising a touchscreen display capable of receiving input information from a touch of a user or a stylus.

10. The UE according to claim 1, wherein the wireless network comprises a network based on a Bluetooth-based standard, an IEEE 802.11-based standard, an IEEE 802.16-based standard, an IEEE 802.18-based wireless network standard, a Third Generation Partnership Project Long Term Evolution (3GPP LTE) based wireless network standard, a 3GPP2 Air Interface Evolution (3GPP2 AIE) based wireless network standard, a UMTS-based protocol wireless network, a CDMA2000-based protocol wireless network, a GSM-based protocol wireless network, a cellular-digital-packet-data-based (CDPD-based) protocol wireless network, a Mobitex-based protocol wireless network, a Near-Field-Communications-based (NFC-based) link, a WiGig-based network, or a ZigBee-based network, or a combination thereof.

11. A method of uplink power control in a full-duplex wireless network, comprising:
   determining at a wireless device an instantaneous antenna gain of the wireless device;
   determining at the wireless device a target uplink Signal-to-Interference-plus-Noise Ratio ($SINR_{target}$) of an uplink signal of the wireless device to a home base station of the wireless device in a wireless network, the wireless network being a full-duplex system;
   receiving at the wireless station a Noise plus Interference (N+I) level at the home base station;
   determining an uplink power level for the uplink signal of the wireless device based on the determined instantaneous antenna gain, the determined target uplink SINR$_{target}$ and the received N+I level at the home base station; and transmitting the uplink signal to the home base station at the determined uplink power level.

12. The method according to claim 11, wherein the SINR$_{Target}$ is based in part on the instantaneous antenna gain of the wireless device between the wireless device and the home base station, an instantaneous antenna gain of the wireless device between the wireless device and another base station, and an instantaneous antenna gain of the wireless device between the wireless device and another wireless device.

13. The method according to claim 11, wherein determining the uplink power level selects a power level that minimizes wireless-device-to-wireless-device (WD-WD) interference caused by the uplink signal of the wireless device.

14. The method according to claim 11, wherein the receiving at the wireless station the (N+I) level at the home base station of the wireless device is by an open-loop feedback technique.

15. The method according to claim 11, wherein the receiving at the wireless station the (N+I) level at the home base station of the wireless device is by a closed-loop feedback technique.

16. The method according to claim 11, wherein the target uplink SINR$_{target}$ at the home base station comprises:

device, and K is the sum of the UL spectral efficiency at the another wireless device and the DL spectral efficiency at the wireless device, and in which K is not function of P.

17. The method according to claim 11, wherein the wireless device comprises a cellular telephone, smartphone, smart-type device, or tablet-type device.

18. The method according to claim 17, wherein the wireless device further comprises a touchscreen display capable of receiving input information from a touch of a user or a stylus.

19. The method according to claim 11, wherein the wireless network comprises a network based on a Bluetooth-based standard, an IEEE 802.11-based standard, an IEEE 802.16-based standard, an IEEE 802.18-based wireless network standard, a Third Generation Partnership Project Long Term Evolution (3GPP LTE) based wireless network standard, a 3GPP2 Air Interface Evolution (3GPP2 AIE) based wireless network standard, a UMTS-based protocol wireless network, a CDMA2000-based protocol wireless network, a GSM-based protocol wireless network, a cellular-digital-packet-data-based (CDPD-based) protocol wireless network, a Mobitex-based protocol wireless network, a Near-Field-Communications-based (NFC-based) link, a WiGig-based network, or a ZigBee-based network, or a combination thereof.

$$SINR_{target}(\text{dB}) \approx \begin{cases} 10\log_{10}\left(\max\left(10^{-\frac{SINR_{Min}}{10}}, \gamma \times SIR_{DL,atUE}^{Non-STR} - 1\right)\right) & Non\text{-}STR \\ 10\log_{10}\left(\max\left(10^{-\frac{SINR_{Min}}{10}}, \frac{1}{\gamma_1 \times \frac{1}{SIR_{DL,atUE}^{Non-STR}} + \gamma_2 \times \frac{1}{SI_{UE-UE}R_{DL,atUE}^{STR}}} - 1\right)\right) & STR \end{cases}$$

in which SINR$_{MIN}$ is a minimum uplink SINR in dB at the home base station for cell-edge wireless devices, $$\gamma_1 = \frac{N_1 + I_1}{N_2 + I_2 + PG_2},$$

$$\gamma_2 = \frac{N_1 + I_1}{N_3 + I_3 + PG_3},$$

$$\gamma = \frac{1}{\gamma_1}$$

$$SIR_{DL,atUE}^{Non-STR} \approx \frac{G_1}{G_2},$$

$$SI_{UE-UE}R_{DL,atUE}^{STR} \approx K\frac{G_1}{G_3},$$

N$_1$+I$_1$ is the noise plus interference level at the home base station, N$_2$+I$_2$ is the noise plus interference level at a base station that is not the home base station, and N$_3$+I$_1$ is the noise plus interference level at another wireless device, P is the uplink transmit power at the wireless device, G$_1$ comprises the instantaneous antenna gain between the wireless device and the home base station of the wireless device, G$_2$ comprises an instantaneous antenna gain between the wireless device and a base station that is not the home base station of the wireless device, and G$_3$ comprises an instantaneous antenna gain between the wireless device and another wireless 20. The method according to claim 11, wherein the wireless device comprises a User Equipment (UE), and the home base station comprises an enhanced Node B (eNodeB).

21. An article comprising: a non-transitory computer readable medium having stored thereon instructions that, if executed, result in at least the following:

determining at a wireless device an instantaneous antenna gain of the wireless device, wherein the instantaneous antenna gain is approximated based at least in part on a half-duplex downlink signal-to-interference ratio and a full duplex downlink signal to inter-user equipment ratio;

determining at the wireless device a target uplink Signal-to-Interference-plus-Noise Ratio (SINR$_{target}$), of an uplink signal of the wireless device to a home base station of the wireless device in a wireless network, the wireless network being a full-duplex system;

receiving at the wireless station a Noise plus Interference (N+I) level at the home base station; and determining an uplink power level for the uplink signal of the wireless device based on the determined instantaneous antenna gain, the determined target uplink SINR$_{target}$ and the received N+I level at the home base station.

22. An article according to claim 21, wherein the target uplink SINR$_{target}$ at the home base station comprises:

$$SINR_{target}(\text{dB}) \approx \begin{cases} 10\log_{10}\left(\max\left(10^{-\frac{SINR_{Min}}{10}}, \gamma \times SIR_{DL,atUE}^{Non\text{-}STR} - 1\right)\right) & Non\text{-}STR \\ 10\log_{10}\left(\max\left(10^{-\frac{SINR_{Min}}{10}}, \dfrac{1}{\gamma_1 \times \dfrac{1}{SIR_{DL,atUE}^{Non\text{-}STR}} + \gamma_2 \times \dfrac{1}{SI_{UE\text{-}UE}R_{DL,atUE}^{STR}}} - 1\right)\right) & STR \end{cases}$$

in which $SINR_{MIN}$ is a minimum uplink SINR in dB at the home base station for cell-edge wireless devices, $$\gamma_1 = \frac{N_1 + I_1}{N_2 + I_2 + PG_2},$$

$$\gamma_2 = \frac{N_1 + I_1}{N_3 + I_3 + PG_3},$$

$$\gamma = \frac{1}{\gamma_1}$$

$$SIR_{DL,atUE}^{Non\text{-}STR} \approx \frac{G_1}{G_2},$$

$$SI_{UE\text{-}UE}R_{DL,atUE}^{STR} \approx K\frac{G_1}{G_3},$$

$N_1+I_1$ is the noise plus interference level at the home base station, $N_2+I_2$ is the noise plus interference level at a base station that is not the home base station, and $N_3+I_1$ is the noise plus interference level at another wireless device, P is the uplink transmit power at the wireless device, $G_1$ comprises the instantaneous antenna gain between the wireless device and the home base station of the wireless device, $G_2$ comprises an instantaneous antenna gain between the wireless device and a base station that is not the home base station of the wireless device, and $G_3$ comprises an instantaneous antenna gain between the wireless device and another wireless device, and K is the sum of the UL spectral efficiency at the another wireless device and the DL spectral efficiency at the wireless device, and in which K is not a function of P.

23. The article according to claim 21, further comprising transmitting the uplink signal to the home base station at the determined uplink power level.

24. The article according to claim 21, wherein determining the uplink power level selects a power level that minimizes wireless-device-to-wireless-device (WD-WD) interference caused by the uplink signal of the wireless device.

25. The article according to claim 21, wherein the receiving at the wireless station the (N+I) level at the home base station of the wireless device is by an open-loop feedback technique.

26. The article according to claim 21, wherein the receiving at the wireless station the (N+I) level at the home base station of the wireless device is by a closed-loop feedback technique.

27. The article according to claim 21, wherein the wireless device comprises a cellular telephone, smartphone, smart-type device, or tablet-type device.

28. The article according to claim 26, wherein the wireless device further comprises a touchscreen display capable of receiving input information from a touch of a user or a stylus.

29. The article according to claim 21, wherein the wireless network comprises a network based on a Bluetooth-based standard, an IEEE 802.11-based standard, an IEEE 802.16-based standard, an IEEE 802.18-based wireless network standard, a Third Generation Partnership Project Long Term Evolution (3GPP LTE) based wireless network standard, a 3GPP2 Air Interface Evolution (3GPP2 AIE) based wireless network standard, a UMTS-based protocol wireless network, a CDMA2000-based protocol wireless network, a GSM-based protocol wireless network, a cellular-digital-packet-data-based (CDPD-based) protocol wireless network, a Mobitex-based protocol wireless network, a Near-Field-Communications-based (NFC-based) link, a WiGig-based network, or a ZigBee-based network, or a combination thereof.

30. The article according to claim 21, wherein the wireless device comprises a User Equipment (UE), and the home base station comprises an enhanced Node B (eNodeB).

\* \* \* \* \*